United States Patent [19]
Kuntman

[11] Patent Number: 5,311,184
[45] Date of Patent: May 10, 1994

[54] AIRBORNE WEATHER RADAR SYSTEM WITH AIRCRAFT ALTITUDE AND ANTENNA TILT ANGLE DEPENDENT SENSITIVITY TIME CONTROL

[75] Inventor: Daryal Kuntman, Highland Beach, Fla.

[73] Assignee: AlliedSignal Inc., Morris Township, Morris County, N.J.

[21] Appl. No.: 23,516

[22] Filed: Feb. 26, 1993

[51] Int. Cl.⁵ .......................... G01S 13/95; G01S 7/34
[52] U.S. Cl. ................................. 342/26; 342/205
[58] Field of Search ............................ 342/26, 205

[56] References Cited

U.S. PATENT DOCUMENTS

| | | | |
|---|---|---|---|
| 3,366,951 | 1/1968 | Lhermitte et al. | 342/26 |
| 3,525,095 | 8/1970 | Cordry | 342/26 |
| 5,047,775 | 9/1991 | Alitz | 342/26 |
| 5,202,690 | 4/1993 | Frederick | 342/26 |

Primary Examiner—T. H. Tubbesing
Attorney, Agent, or Firm—Howard G. Massung

[57] ABSTRACT

Sensitivity time control (STC) data for an airborne weather radar system is provided as a function of aircraft altitude and radar system antenna tilt angle to normalize radar return signals at high as well as low aircraft altitudes. In one form of the invention the STC data is used to adjust the gain of a signal applied to a radar system received by a system antenna and in another form of the invention the STC data is used to establish a desired threshold for said signal.

10 Claims, 5 Drawing Sheets

AIRBORNE WEATHER RADAR SYSTEM WITH AIRCRAFT ALTITUDE AND ANTENNA TILT ANGLE DEPENDENT SENSITIVITY TIME CONTROL

BACKGROUND OF THE INVENTION

This invention relates generally to airborne weather radar systems and, more particularly, to systems of the type described with aircraft altitude and antenna tilt angle dependent sensitivity time control for normalizing return signals from a target at high as well as low altitudes.

For airborne weather radar systems, the level of return signals from a target is a function of target range. As the range increases, the level of the return signals is reduced. Sensitivity time control (STC) is a well known means for controlling the radar system receiver gain as a function of time, which is equivalent to range, in order to normalize the level of return signals from targets at different ranges.

For airborne weather radar systems with beam filling targets, the return signal levels are proportional to the inverse of the range squared. As a result, normally six dB per octave has been an accepted and specified STC slope. In this regard, reference is made to the publication RTCA DO-173, Minimum Operational Performance Standards For Airborne Weather And Ground Mapping Pulse Radars.

Weather cells, i.e. thunderstorms and the like, have high reflectivity at low altitudes due to rain droplets in the weather cells resulting in high return signal levels. At higher altitudes, the water content in the weather cells is in the form of ice with much lower reflectivity resulting in low return signal levels. The crossover altitude between high and low reflectivity has been found to be within twenty and twenty-five thousand feet. When an aircraft is flying above these altitudes, the radar beam reacts to both low and high reflectivity of the weather cells. As a result, the return signal levels do not follow the aforementioned nominal six dB per octave slope. Thus, if an airborne weather radar system uses the nominal six dB per octave slope for STC, the system excessively attenuates return signals from close-in (high altitude) targets. This problem has been analyzed and described in an article entitled "Comparison of Airborne and Ground Based Weather Radars" by Lester P. Merritt, published in Dec., 1969 by the National Severe Storms Laboratory, ESSA, U.S. Department of Commerce. The present invention obviates this problem by normalizing return signal levels for high as well as low aircraft altitudes.

SUMMARY OF THE INVENTION

This invention relates to an airborne weather radar system with aircraft altitude and antenna tilt angle dependent sensitivity time control (STC) wherein, in one form of the invention, variable gain is used in the radar system receiver chain. An STC generator provides an output which is applied to the system receiver as a variable gain input. A trigger signal triggers radar transmission. In this form of the invention, the STC generator is responsive to aircraft altitude signals, antenna tilt angle signals and the trigger signal to generate the variable gain input as a function of time from transmission, aircraft altitude and antenna tilt angle.

In another form of the invention, a fixed gain is used in the receiver chain. The STC generator provides an output which changes the threshold of a comparator. The comparator determines if a signal from the system receiver exceeds a predetermined level, in which event the signal is displayed. In implementing this form of the invention, the STC generator provides the threshold signal as a function of time to transmission, aircraft altitude and antenna tilt angle, as is the case in the first mentioned form of the invention.

DETAILED DESCRIPTION OF THE INVENTION

Figure 1:
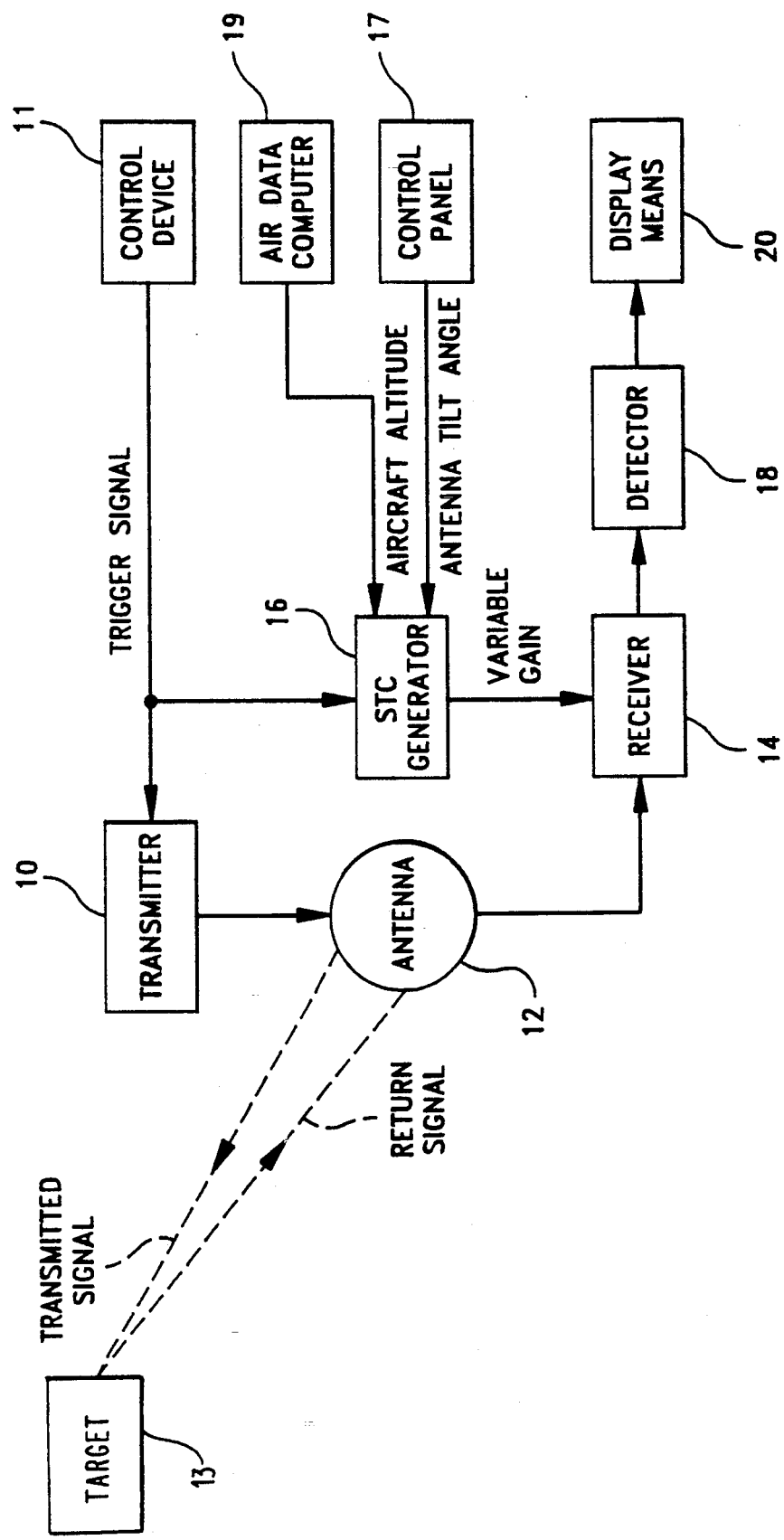
FIG. 1 is a block diagram illustrating one form of the invention.

With reference to the form of the invention shown in FIG. 1, a control device 11, which may be a microprocessor, applies a trigger signal to a radar system transmitter 10 to initiate radar transmission. Transmitter 10 applies a signal to a radar system antenna 12 which transmits a radar signal. The signal is intercepted by a target (weather cell) 13. Antenna 12 receives a return signal from target 13 and thereupon applies a signal to a radar system receiver 14.

The trigger signal from control device 11 is applied to a sensitivity time control (STC) generator 16. Radar system antenna tilt angle signals as are available from instrumentation in a control panel 17 and aircraft altitude signals as are available from a barometer or an air data computer 19 are applied to STC generator 16. The STC generator provides a variable gain signal which is applied to receiver 14 for adjusting the gain of the signal applied thereto from antenna 12. Receiver 14 provides a gain adjusted signal which is detected by a detector 18. Detector 18 is of the type which is responsive to the signal from receiver 14 for providing a video signal. The video signal is displayed by a display means 20 so as to be observed by an observer for controlling an aircraft accordingly.

With the arrangement shown and described with reference to FIG. 1, variable gain is provided in the radar system receiver chain. STC is generated by STC generator 16 which varies the gain of the signal from antenna 12 applied to receiver 14. The variable gain is provided as a function of time for transmission, aircraft altitude and antenna tilt angle as will now be appreciated.

Figure 3:
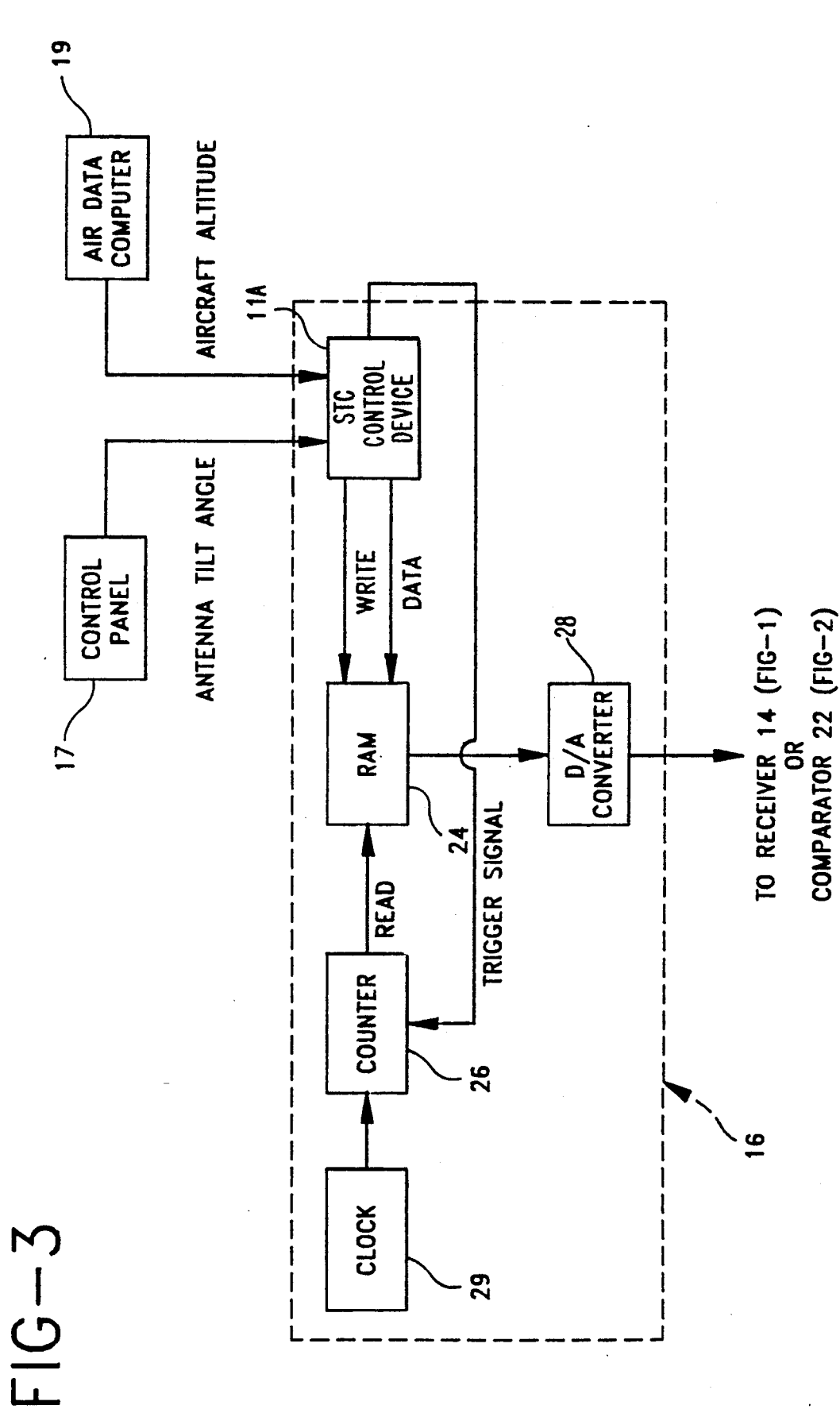
FIG. 3 is a block diagram illustrating an STC generator in accordance with the invention.

A preferred configuration for STC generator 16 is illustrated in FIG. 3 and will be hereinafter described. Transmitter 10, antenna 12, receiver 14, detector 18 and display means 20 are of the type well known to those skilled in the art.

Figure 2:
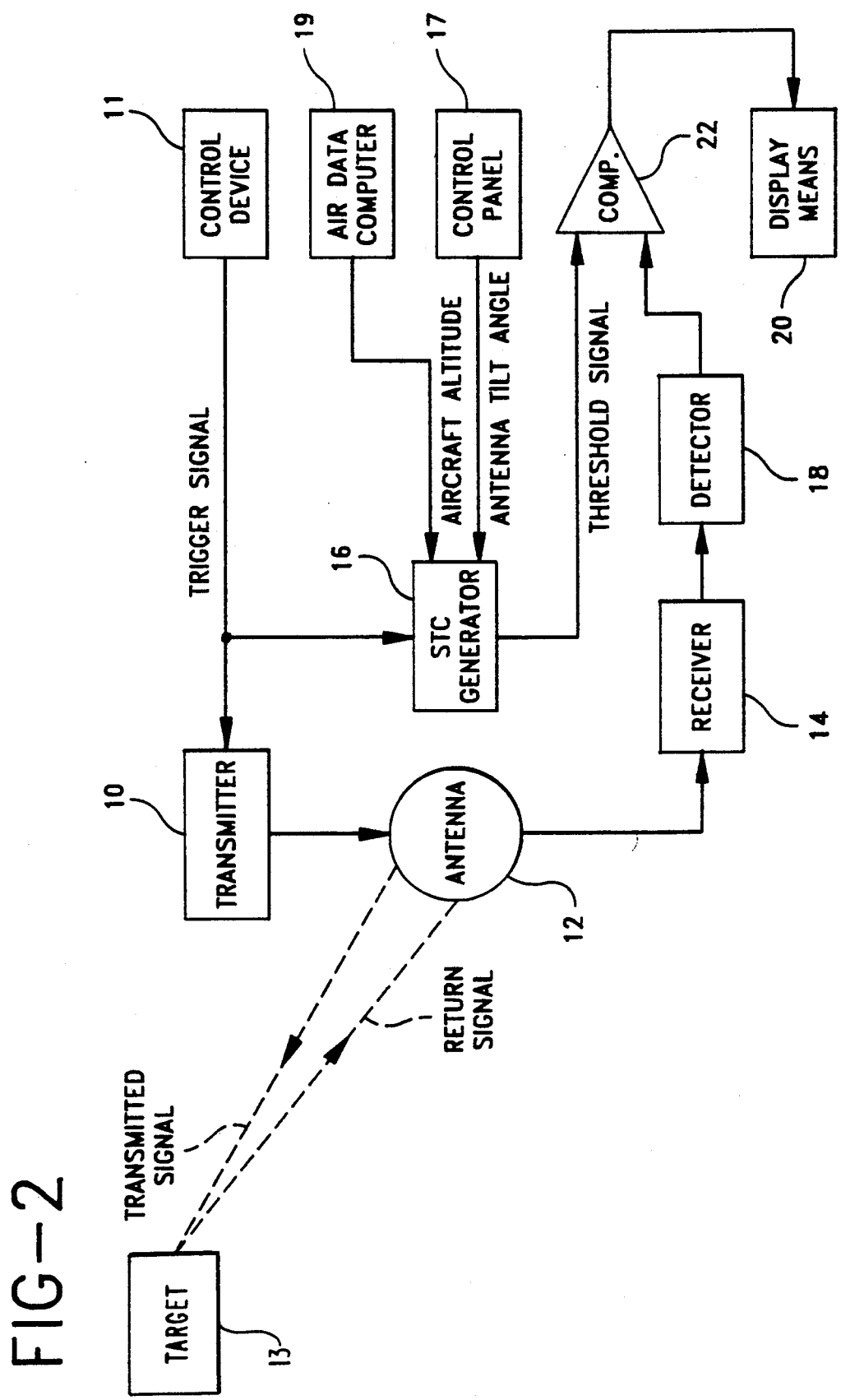
FIG. 2 is a block diagram illustrating another form of the invention.

In the form of the invention shown in FIG. 2, transmitter 10 is triggered by the trigger signal from control device 11 to initiate radar transmission. Transmitter 10 applies a signal to antenna 12 which transmits a radar signal to target 13. Antenna 12 receives a return signal from target 13 and applies a signal to receiver 14 which, in turn, applies a signal to detector 18, whereupon the detector provides a video signal which is applied to detector 18, as aforenoted.

In this form of the invention, STC generator 16 is triggered by the trigger signal from control device 11 and provides a signal in response to the aircraft altitude and antenna tilt angle signals from air data computer 19 and the instrumentation in control panel 17, respectively, and which signal is in effect a threshold signal. The threshold signal is applied to a comparator 22. The video signal from detector 18 is likewise applied to comparator 22 which determines if the video signal from detector 18 exceeds the level of the threshold signal. If the threshold signal level is exceeded, comparator 22 applies a video signal to display means 20 for observation by an observer for controlling an aircraft accordingly.

Thus, in the form of the invention described and illustrated with reference to FIG. 2, receiver 14 has a fixed gain. The STC function is achieved by changing the threshold applied to comparator 22 which determines if the detected video signal from detector 18 exceeds a predetermined level to be displayed. In this implementation, the threshold signal is likewise provided as a function of time from transmission, aircraft altitude and antenna tilt angle.

STC generator 16 is illustrated in FIG. 3 as aforenoted, and will be next described. Comparator 22 is of the type well known to those skilled in the art.

It will now be appreciated that STC generator 16 generates a signal as a function of time, which is equivalent to the range of the airborne antenna system to a target, with reference to a transmitted radar signal. In earlier generation airborne radar systems, STC generator 16 was implemented using resistors and capacitors to generate a time dependent signal for controlling receiver gain. Later generation airborne radar systems used digital signal generation including digital circuitry and memory devices to store STC information and to generate a time dependent signal for controlling receiver gain through digital-to-analog converters. The STC generating means generally shown in FIGS. 1 and 2 uses digital means to generate time dependent signals for either controlling the gain of receiver 14, as shown in FIG. 1, or for providing a threshold signal, as shown in FIG. 2.

With the above in mind, particular reference is made to FIG. 3 which shows the structural arrangement of STC generator 16 in accordance with a preferred embodiment of the invention.

Thus, STC generator 16 includes an STC control device 11A, a random access memory (RAM) 24, a counter 26, a digital-to-analog converter 28 and a clock 29. Aircraft altitude and antenna tilt angle signals are applied to STC control device (microprocessor) 11A via air data computer 19 and control panel 17, respectively. In most aircraft, these signals are provided to the airborne radar system via digital data buses. The most commonly used digital data buses for the purpose described are ARINC 429 (Aeronautical Radio, Inc.) for commercial aircraft, and MIL-STD-1553 for military aircraft. Details of these data buses are well known to those skilled in the art and are not otherwise illustrated or described.

Figure 4:
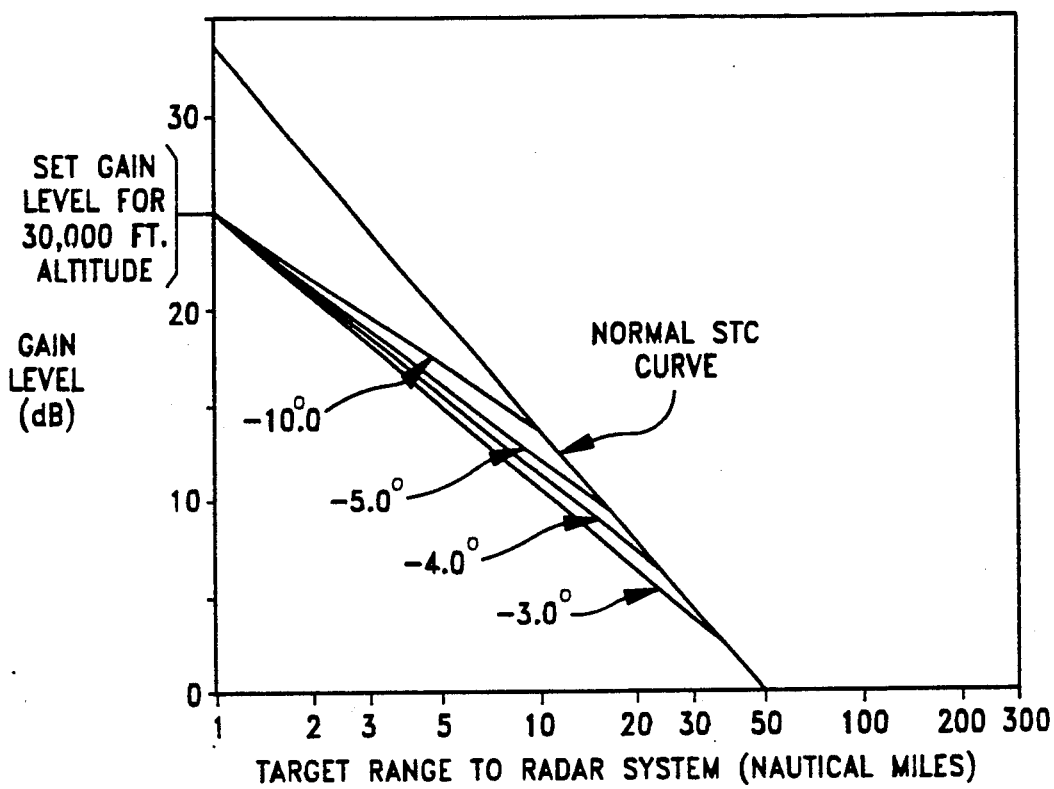
FIG. 4 is a graphical representation illustrating a set of STC curves for an aircraft altitude of thirty thousand feet and for various antenna tilt angle settings, and indicating a set return signal gain level for 30,000 feet.
Figure 5:
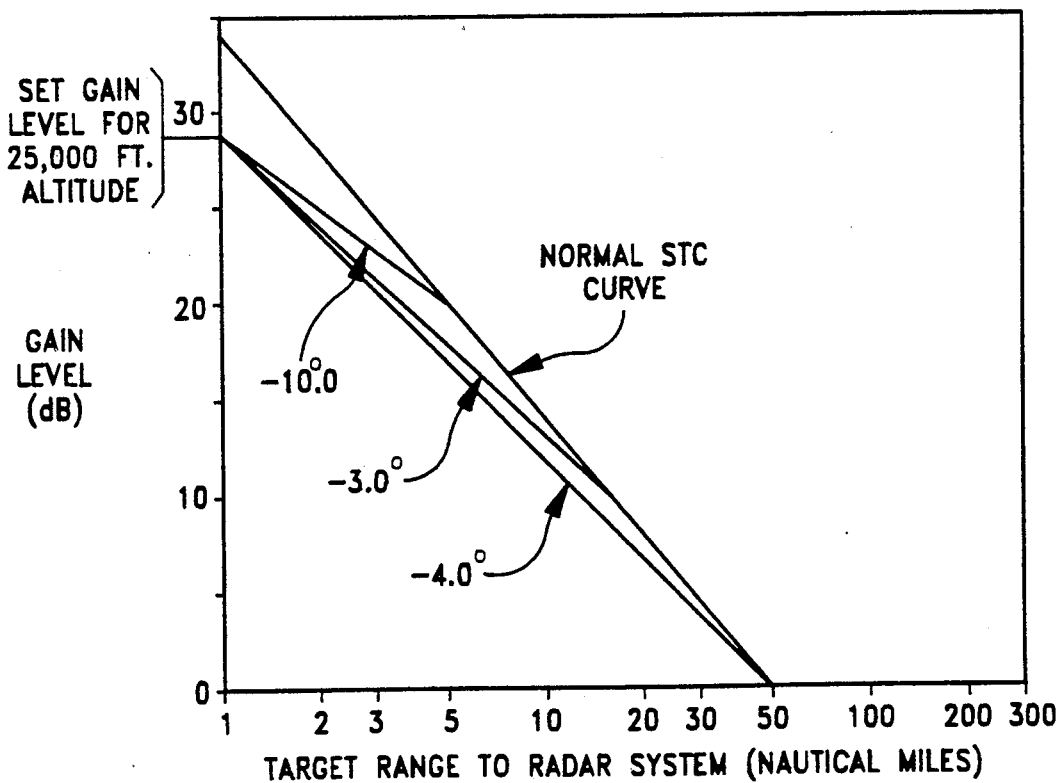
FIG. 5 is a graphical representation illustrating a set of STC curves for an aircraft altitude of twenty-five thousand feet and for various antenna tilt angle settings, and indicating a set return signal gain level for twenty-five thousand feet.
Figure 6:
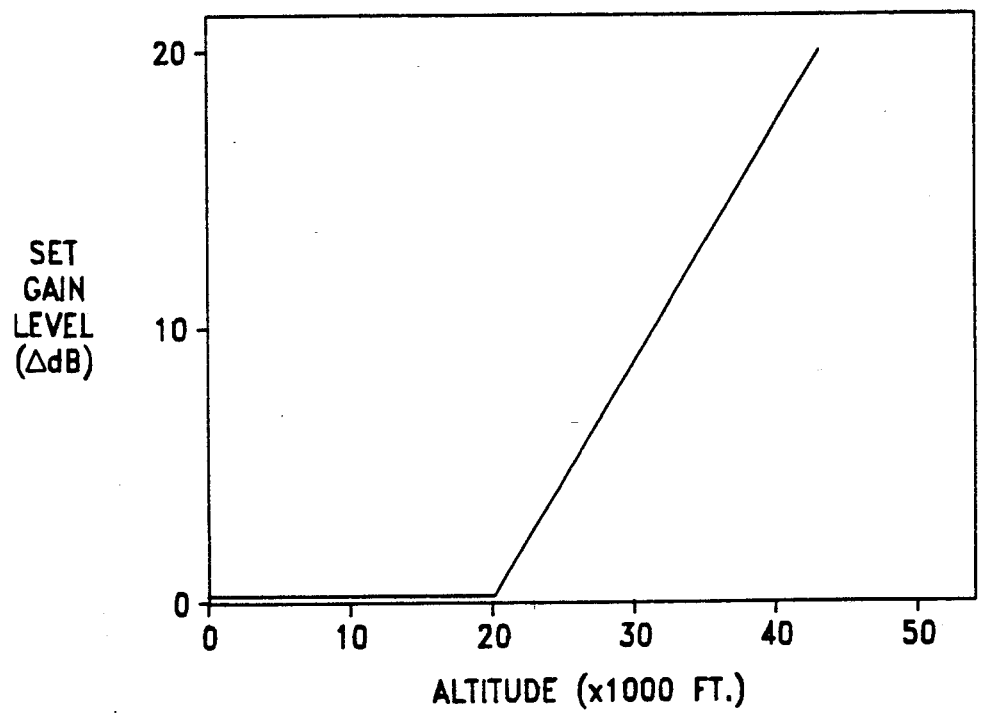
FIG. 6 is a graphical representation illustrating a representative plot of set gain levels as a function of aircraft altitude.

Based on the aircraft altitude and antenna tilt angle signals, STC control device 11A determines the range at which a transmitted radar signal crosses an aircraft altitude of twenty thousand feet. Then, a set gain level is determined by the control device, based on the aircraft altitude, as illustrated by the graphical representation of FIG. 6. Using the data so obtained, STC control device 11A determines the desired STC as a function of range. Examples of typical STC curves as a function of range are illustrated by the graphical representations of FIGS. 4 and 5.

STC control device 11A converts the range dependent STC data to time dependent data, based on the speed at which transmitted radar signals travel to a target and return therefrom. 12.36 microseconds per nautical mile is used for this time in most implementations.

STC control device 11A quantizes the time dependent STC data into time intervals corresponding to the period of clock 29. The output of the clock is applied to counter 26 as is the trigger signal from control device 11. STC data for each time interval with respect to the transmitted signal is stored in RAM 24 which receives a read address from counter 26. The data storage usually takes place during the interval between all signal returns from the previously transmitted signal, while processing occurs during the next transmission of a signal. STC control device 11A provides a write address and input data to RAM 24.

It will be understood that for purposes of simplification, control device 11 and STC control device 11A are shown and described as separate devices, but can be implemented into a single microprocessor.

Counter 26 generates the addresses to read the STC data from the RAM synchronously with the trigger signal. Counter 26 is re-set to zero when the trigger signal is transmitted and advances with system clock 29.

The data read from RAM 24 represents time dependent STC data in digital data form. Digital-to-analog (D/A) converter 28 converts the digital data to a time dependent analog voltage to either control the gain of receiver 14, as shown in FIG. 1 or to function as a comparator threshold, as shown in FIG. 2. In this connection, it is noted that the gain and threshold signals have the same wave form, although scale factors may have to be applied to the signals as will be understood by those skilled in the art, and as such is not further explained herein.

The arrangement is such that sensitivity time control (STC) is generated with variable gain characteristics. The gain characteristics are determined from aircraft altitude and antenna tilt angle selections. For aircraft altitudes at or below 20,000 feet, the standard STC slope of 6 dB per octave is maintained. For aircraft altitudes above 20,000 feet, 6 dB per octave slope is maintained for ranges where the radar beam center is below an altitude of 20,000 feet. Inside that range, the STC slope is altered to obtain a set gain at a range of one nautical mile. This set gain level is a function of aircraft altitude. If the selected antenna tilt angle is such that the center of the radar beam does not go below the 20,000 feet altitude, then the STC slope is determined on the basis of starting gain adjustment as the normal STC, but obtaining the set gain level at a range of one nautical mile based on aircraft altitude. The arrangement is implemented as particularly shown in FIGS. 1 and 2.

There has thus been described an airborne weather radar system which provides sensitivity time control (STC) based on aircraft altitude and radar system antenna tilt angle to normalize radar return signals at high as well as low aircraft altitudes, as is desireable and which is an improvement over the prior art. STC data is used to adjust the gain of the signal applied to the radar system receiver by the system antenna, or to provide a threshold which establishes a desired level for said signal.

With the above description of the invention in mind, reference is made to the claims appended hereto for a definition of the scope of the invention.

What is claimed is:

1. An airborne weather radar system, comprising:
   control means for providing a trigger signal for initiating radar transmission;
   transmitter means connected to the control means and responsive to the trigger signal therefrom for providing a transmitter signal;
   antenna means connected to the transmitter means and responsive to the transmitter signal for transmitting a radar signal which is intercepted by a target, with said antenna means receiving a return signal from the target and thereupon providing an output signal;
   receiver means connected to the antenna means for receiving the output signal therefrom and for providing a receiver signal;
   means for providing a signal corresponding to the altitude of an aircraft on which the radar system is mounted;
   means for providing a signal corresponding to the tilt angle of the radar system antenna;
   sensitivity time control (STC) generator means connected to the aircraft altitude and antenna tilt angle signal means, and connected to the control means, and responsive to the aircraft altitude signal, the antenna tilt angle signal and the trigger signal for providing an STC signal as a function of time from transmission of the radar signal, aircraft altitude and antenna tilt angle; and
   utilization means connected to the STC generator means and to the output of the antenna means and responsive to the STC signal and the antenna output signal for providing a signal which is indicative of a normalized return signal from the target at high as well as low aircraft altitudes.

2. An airborne weather radar system as described by claim 1, wherein the STC signal from the STC generator means is a variable gain adjusting signal, and the utilization means connected to the STC generator means and to the output of the antenna means includes:
   the receiver means connected to the output of the antenna means and to the STC generator means and responsive to the antenna output signal and the variable gain adjusting signal so that the gain of the receiver signal is adjusted as a function of time from transmission, aircraft altitude and antenna tilt angle;
   detector means connected to the receiver means and responsive to the variable gain adjusted signal from the receiver means for providing a video signal; and
   means connected to the detector means for displaying the video signal.

3. An airborne weather radar system as described by claim 1, wherein the STC signal from the STC generator is a threshold signal which varies as a function of time from transmission of the radar signal, aircraft altitude and antenna tilt angle, and the utilization means connected to the STC generator means and to the output of the antenna means includes:
   the receiver means connected to the output of the antenna means for receiving the output therefrom and for providing the receiver signal;
   detector means connected to the receiver means and responsive to the receiver signal therefrom for providing a video signal;
   comparator means connected to the STC generator means and to the detector means for comparing the video signal from the detector means to the variable threshold signal, and providing an other video signal when the video signal from the detector means exceeds the threshold signal; and
   means connected to the comparator means for displaying the other video signal.

4. An airborne weather radar system as described by claim 1, wherein the STC generator includes:
   STC control means connected to the aircraft altitude signal providing means and to the antenna tilt angle signal providing means and responsive to the signals therefrom and to the trigger signal for determining the range at which the transmitted radar signal crosses a predetermined aircraft altitude, whereupon said STC control means develops gain data based on the actual altitude of the aircraft; and
   the STC control means being responsive to said gain data for developing STC data as a function of the range of the target from the system, and thereupon converting the STC data as a function of range to time dependent data.

5. An airborne weather radar system as described by claim 4, wherein the STC generator means further includes:
   clock means;
   counter means connected to the clock means and connected to the control means for receiving the trigger signal therefrom;
   memory means connected to the counter means and connected to the STC control means;
   said STC control means being effective for quantizing the time dependent data into time intervals corresponding to the period of the clock means;
   the clock means providing an output which is applied to the counter means;
   said counter means being responsive to the clock output and to the trigger signal for providing a memory read signal synchronously with the trigger signal;
   said memory means being controlled by the control means for storing the time dependent data for each of the time intervals; and
   said memory means being responsive to the memory read signal for providing the STC signal as a function of time from transmission of the radar signal, aircraft altitude and antenna tilt angle.

6. A method for normalizing airborne weather radar system return signals from a target at high as well as low aircraft altitudes, comprising the steps of:
   receiving the return signals;
   providing a sensitivity time control (STC) output as a function of time from transmission of a radar signal, aircraft altitude and radar antenna system tilt angle; and utilizing the STC output and the received return signal for providing an output which is indicative of a normalized return signal at high as well as low aircraft altitudes.

7. A method as described by claim 6, wherein the utilizing step includes:

utilizing the STC output as a variable gain adjusting output and adjusting the gain of the received return signal utilizing the variable gain adjusting output for providing the output indicative of a normalized return signal.

8. A method as described in claim 7, including:

determining the range at which a transmitted radar signal crosses a predetermined aircraft altitude as a function of time of transmission of the radar signal, aircraft altitude and antenna tilt angle;

utilizing the determined range for developing data based on the actual altitude of the aircraft;

utilizing said developed data for developing STC data as a function of the range of the target from the system; and converting the STC data as a function of range to time dependent data.

9. A method as described by claim 8, further including the steps of:

quantizing the time dependent data into time intervals;

storing the time dependent data for each of the time intervals; and reading the stored time dependent data for providing the STC output.

10. A method as described by claim 6, wherein the utilizing step includes:

utilizing the STC output as a variable threshold output;

comparing the variable threshold output to the received returning signals; and providing the output indicative of a normalized return signal when the received threshold signal exceeds the threshold output.

* * * * *